United States Patent [19]
Lemone

[11] 4,171,765
[45] Oct. 23, 1979

[54] ERROR DETECTION SYSTEM

[75] Inventor: Louis A. Lemone, Burlington, Mass.

[73] Assignee: Data General Corporation, Westboro, Mass.

[21] Appl. No.: 917,519

[22] Filed: Jun. 21, 1978

Related U.S. Application Data

[63] Continuation of Ser. No. 828,538, Aug. 29, 1977, abandoned.

[51] Int. Cl.² ............... G06F 11/12; G11C 29/00
[52] U.S. Cl. ..................... 235/312; 340/146.1 AL
[58] Field of Search ............... 235/312; 340/146.1 AL

[56] References Cited

U.S. PATENT DOCUMENTS

| | | | |
|---|---|---|---|
| 3,568,153 | 3/1971 | Kurtz | 340/146.1 AL |
| 3,814,921 | 6/1974 | Nibby et al. | 235/303.2 |
| 3,836,957 | 9/1974 | Duke et al. | 340/146.1 AL |
| 4,005,405 | 1/1977 | West | 235/312 |
| 4,072,853 | 2/1978 | Barlow et al. | 235/312 |

Primary Examiner—Charles E. Atkinson
Attorney, Agent, or Firm—Robert F. O'Connell

[57] ABSTRACT

Error detection circuitry for use in a data processing system which utilizes a programmable logic array for controlling, during a write operating mode, the generation of a write error word by an error register, which write error word is thereupon stored together with the associated data words in a data storage device and for controlling, during a read operating mode, the generation of a read error word, the error register thereupon effectively comparing the read error word with the originally stored write error word to produce a remainder word when an error is present.

9 Claims, 5 Drawing Figures

ERROR DETECTION SYSTEM

This is a continuation of application Ser. No. 828,538, filed Aug. 29, 1977, now abandoned.

INTRODUCTION

This invention relates generally to data processing systems and, more particularly, to error detection circuitry for use therein, such circuitry utilizing error detection code generators for determining whether an error is present in data words which are being read from a data storage element.

BACKGROUND OF THE INVENTION

In reading data words from a data storage device for use in a data processing system, it is desirable to determine whether or not the data words, as read out, are the same as the data words which have previously been written into such storage device, i.e., to detect the presence of one or more incorrect data bits therein. Such data storage device, for example, may be a magnetic storage disk onto which a serial data bit stream forming a block of data words has been written, which data words are read out therefrom at a later time.

In conventional error detection circuits, in order to make such a determination the data words which are written onto the disk are accompanied during the "write" mode of operation by an additional error word which has been generated in accordance with a selected polynomial function from the data words which are being stored. During the "read" mode of operation a "read" error word is generated in accordance with a selected polynomial which is equivalent to the "write" polynomial from the data words which are being read out from the storage device. The "write" error word which is then read out from the disk is effectively compared with the "read" error word which is generated during the readout process and, if no error is present in the data words which have been read out, the remainder from an error correction code register utilized for such purpose is zero. If, on the other hand, an error is present, a non-zero remainder is present in the error correction code register. Such non-zero remainder can thereupon be recovered and supplied to the data processing system to signify that one or more errors are present. Such remainder can then be appropriately interpreted for determining the location of and for correcting the errors in accordance with techniques known in the art.

Generally, such error detection circuitry requires relatively complex multiplexing logic and further complex polynomial selection and generation logic requiring a relatively large number of logical elements. Such complexity not only increases the cost of the error detection circuitry but also decreases its reliability. It is desirable, therefore, to simplify as much as possible the error detection circuitry configuration so that hardware complexity and cost considerations can be considerably reduced.

BRIEF SUMMARY OF THE INVENTION

In accordance with the invention, an error detection system for use in detecting errors in serial data which has been read out from a data storage device is greatly simplified by performing the complicated multiplexing and polynomial generation operations with the use of a programmed logic array, the inputs to which are selected to produce desired selected outputs in a manner which greatly simplifies the error detection hardware and reduces the cost of the overall error detection system. The use of a programmed logic array not only eliminates the multiplexing and polynomial generation logic which is normally required but also sets up appropriate controls for the read and write operations.

DESCRIPTION OF THE INVENTION

The invention is described in more detail with reference to the following figures wherein.

Figure 1:
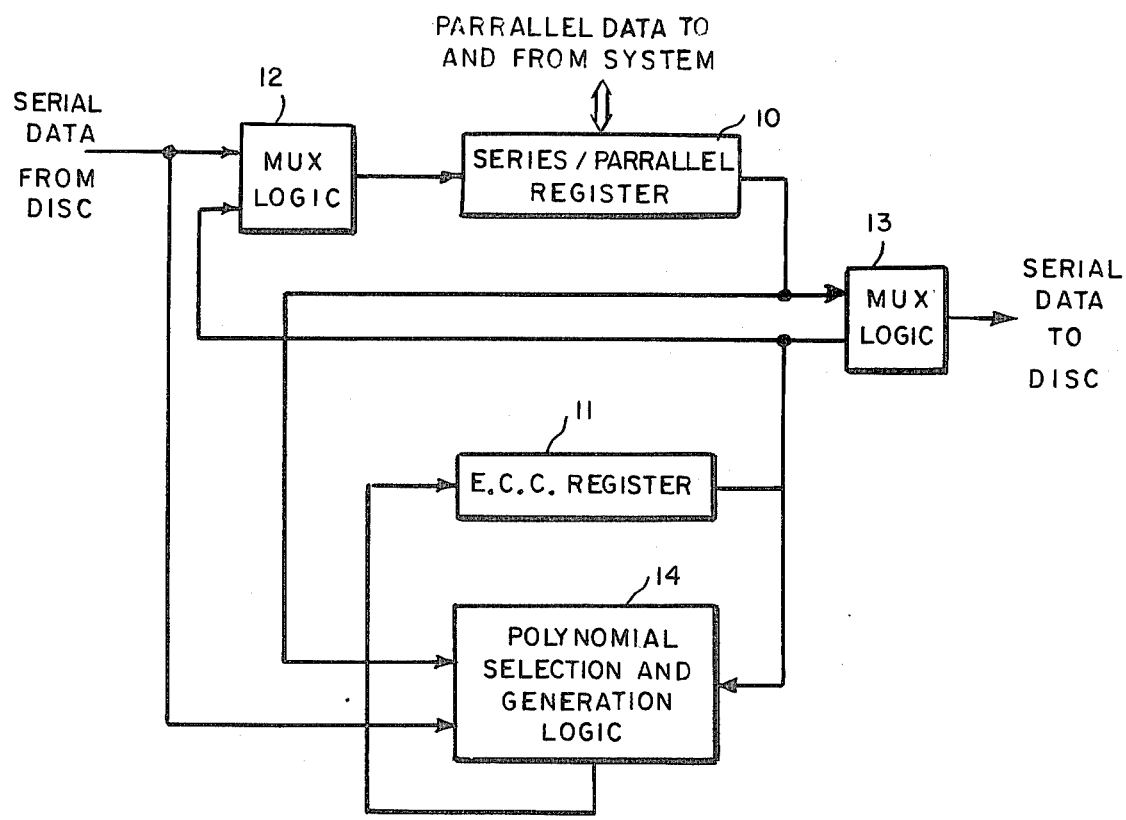
FIG. 1 shows a block diagram of a conventional error detection system as used in the prior art.

As can be seen in FIG. 1, a conventional error detection system utilizes a shift register $1\phi$, an error correction code (ECC) register 11, suitable multiplexing logic 12 and 13, and relatively complex polynomial selection and generation logic 14. A system of the type shown in FIG. 1 may be found, for example, in the Technical Manual for DG/DISC Storage Subsystems (6060 Series, 100 Megabyte), published by Data General Corporation, Southboro, Mass. as Manual No. 015-000061-00 for the Data General Series 6060 products.

In the operation of such a prior art error detection system, data which is to be used in a data processing system is generally obtained from or supplied to such system in parallel form. Shift register $1\phi$ converts such data obtained from the data processing system from parallel to series form for storage in a storage device, such as a magnetic disk storage unit, or obtains serial data from the storage device and provides such data in parallel form to the data processing system. Thus, during the write mode of operation, a block of parallel data words, e.g., 16-bit data words, are entered into shift register $1\phi$, the data words being supplied in serial form to the disk and to an error correction code (ECC) register 11 via polynomial selection and generation logic 14. Such logic is arranged so that the ECC register 11 thereupon provides an error word, e.g., a 32-bit word, in accordance with a suitable selected polynomial function, from the data words which are entered into register 11 and are being written onto the disk. Such a polynomial is a pre-selected one, the selection thereof being based upon well-known mathematical techniques which are known to the art for such purpose.

The ECC register 11 provides a number of operations during the write and/or read modes. First of all, during the write mode discussed above, it produces the write error word, based on the selected polynomial, for writing onto the disk, such error word being generated in accordance with a desired implementation of logic elements utilizing exclusive-OR (X-OR) logic gates suitably interconnected in a feedback configuration, as discussed below. Secondly, the ECC register 11 functions as a shift register during the write mode for writing the write error word onto the disk after the data words have been written. Thirdly, during the read mode, the ECC register 11 produces a read error word from the data words being read out from the disk in accordance with a read polynomial utilizing a different implementation of exclusive-OR logic gates in a different feedback configuration. Finally, register 11 functions as a shift register for comparing the write error word with the read error word and for providing a zero or a non-zero remainder as a result of such comparison. The remainder is thereupon supplied to the data processing system together with the data words and if the remainder is non-zero, it will signify that an error is present.

Extensive combinational logic is required to enable and disable the exclusive-OR gates in accordance with the desired feedback configurations required for the different operational modes of the ECC register. Such combinational logic gives rise to increasing time delays between stages of the ECC register operation so that at very high data rates, which may in some cases at the present time approach 10 MHz., for example, very high speed, and high power-consuming, circuits are required. Further, when writing data onto the disk it is necessary to write both the original data words and the ECC register error word content. Such operation, in effect, requires a multiplexing process for multiplexing the contents of the shift register 1$\phi$ and the ECC register 11. Further, when reading data from the disk it is necessary to be able to read the contents of both the data words and the write error word from the disk as well as to generate a read error and the remainder from a comparison of the error words in the ECC register. Such a process also requires the use of multiplexing operations, under suitable control.

Figure 2:
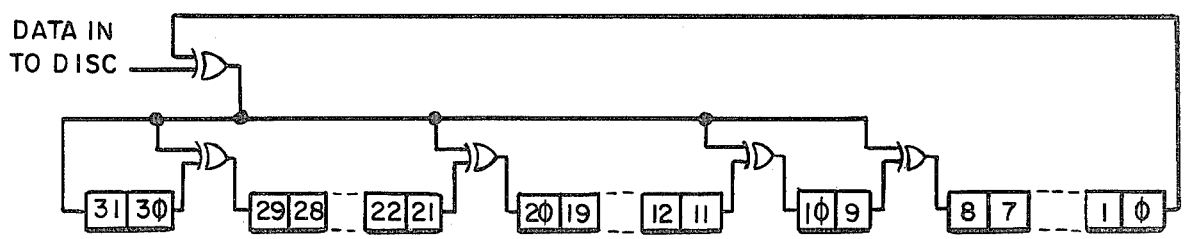
FIGS. 2 and 3 show in more detail the conventional prior art logic for generating the polynomials used in the prior art system of FIG. 1.
Figure 3:
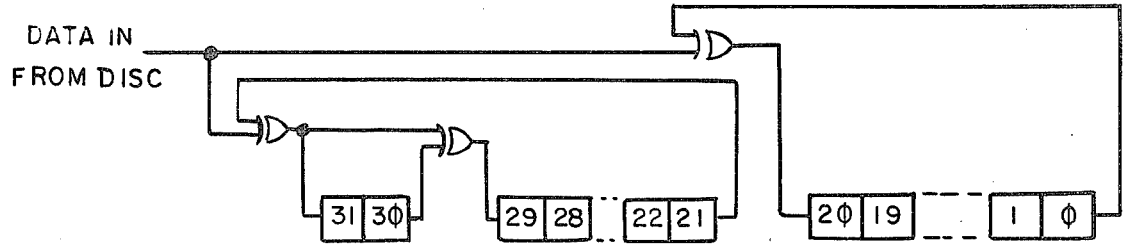

FIGS. 2 and 3 show exemplary exclusive-OR feedback configurations of the prior art for utilization with the ECC register 11 to generate the desired write and read error words in accordance with selected polynomial functions. In a particular example for a 32-bit ECC register, a polynomial, as previously selected by those in the art, which can be utilized during the write mode is as follows:

$$x^{32}+x^{23}+x^{21}+x^{11}+x^2+1$$

A selected read polynomial which is equivalent to the write polynomial is in the form of two factors as follows:

$$(x^{11}+x^2+1)(x^{21}+1)$$

In the conventional error detection system of FIG. 1 exclusive-OR feedback logic for each of such polynomials is shown in FIGS. 2 and 3, respectively. As can be seen therein, in order to implement the polynomial generation logic for both the write and read mode, relatively complex X-OR gating circuitry is required. Further, relatively complicated multiplexing logic is also needed. Accordingly, the overall gate count becomes relatively high and the overall power consumption correspondingly large. Because of the time delays involved, operation at higher speed becomes difficult unless high speed and high power-consuming elements are utilized. Moreover, the laying out of the error detection circuitry on a program control board for use in a data processing system becomes complicated and the total area which must be utilized on such board becomes larger than is desired. Further, because of the large number of logic elements required there is an inherent reliability problem since there are so many elements present which can be subject to failure.

Figure 4:
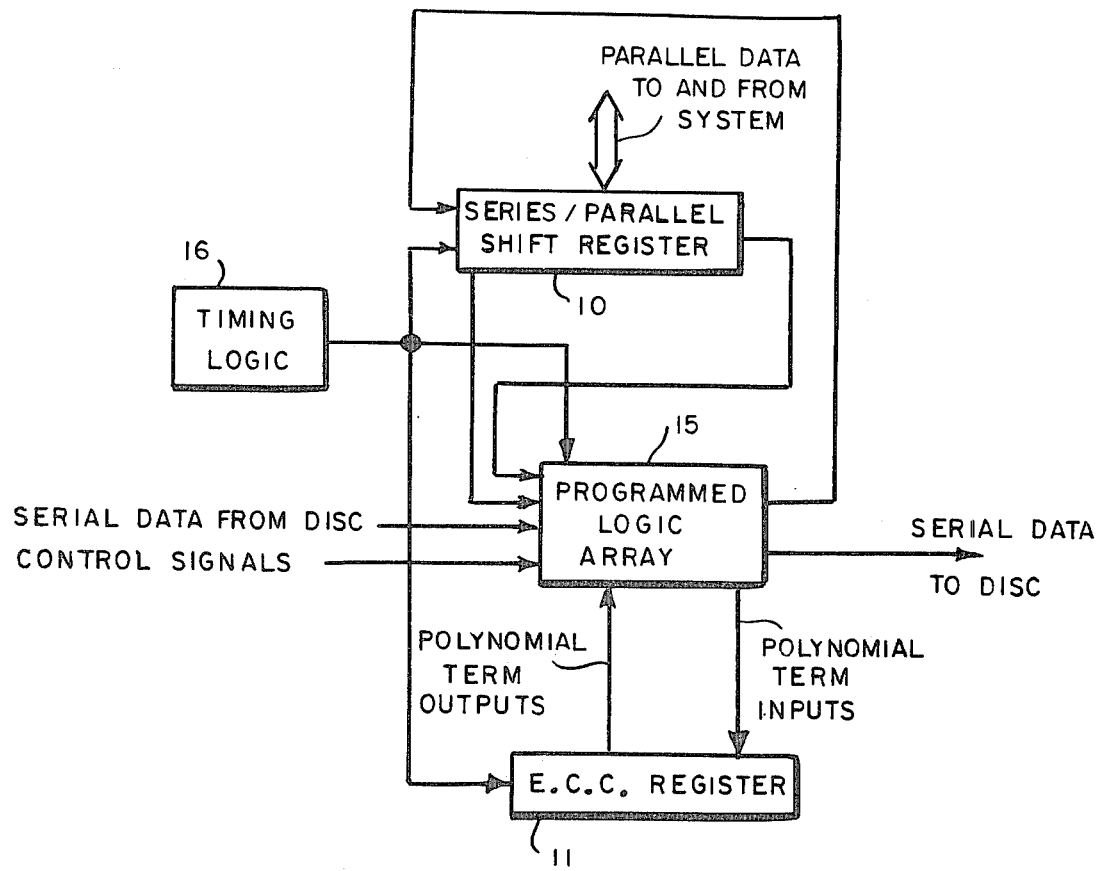
FIG. 4 is a general block diagram of a preferred embodiment of the error detection system of the invention.

In order to overcome such disadvantages, this invention effectively replaces the polynomial selection and generation logic 14, as well as the logic required for the multiplexing operations discussed above, by a single programmed logic array as shown in FIG. 4. As can be seen in the latter figure, parallel data to and from a data processing system is supplied to or taken from series/parallel shift register 1$\phi$, essentially of the type shown in FIG. 1. An ECC register 11, also the type as shown in FIG. 1, is used. Control of the read and write modes of operation, the generation of the necessary polynomial functions, and the multiplexing of various operations therefor is lodged in the program logic array 15.

The program logic array, which is described in more detail below, is appropriately arranged not only to provide the desired multiplexing operations during the various operating modes, but also to generate the desired error words in accordance with the polynomial functions during the read and write modes. Suitable timing of the overall operation is provided by appropriate and conventional timing logic circuitry 16.

Figure 5:
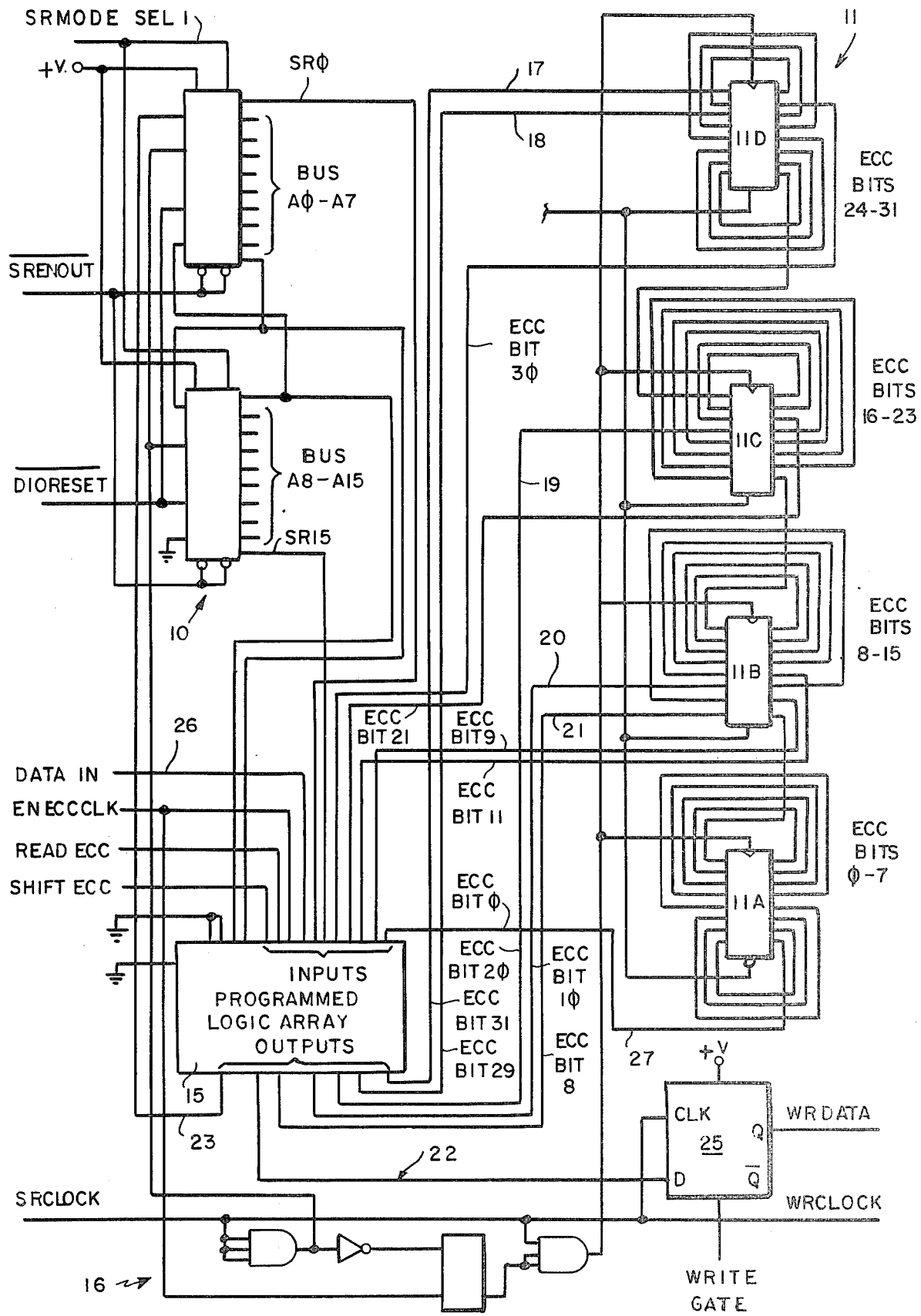
FIG. 5 is a more detailed block diagram of the system of the invention shown in FIG. 4.

The structure and operation of the system of the invention shown in FIG. 4 can be understood in more detail with reference to FIG. 5. As seen therein, the shift register 1$\phi$ provides appropriate terminals for supplying 16-bit, parallel data words to the data processing system or for receiving 16-bit, parallel data words from the system, as depicted by the 16 bits identified as BUS A$\phi$ through BUS A15. Such data bits are suitably supplied in parallel to and from the data processing system on an appropriate data bus (not shown) in accordance with conventional techniques. Serial data is also supplied to or from the shift register 1$\phi$, the input terminal identified as SR$\phi$ being available at one end of the register when supplying data at the input to the register and the output terminal identified as SR15 available at the other end for supplying serial data at the output of the register.

The ECC register 11 comprises four 8-bit registers 11A through 11D for providing a 32-bit error word having bits ECC$\phi$ through ECC31, bits ECC$\phi$ through ECC7 being associated with register 11A, bits ECC8 through ECC15 being associated with register 11B, bits ECC15 through ECC23 being associated with register 11C, and bits ECC24 through ECC31 being associated with register 11D. Specific ECC data bits required for use in a programmed logic array to generate the desired polynomial functions are more specifically identified in FIG. 5 as ECC bit $\phi$, ECC bit 9, ECC bit 1$\phi$, ECC bit 2$\phi$, ECC bit 21, ECC bit 29, ECC bit 3$\phi$ and ECC bit 31.

Programmed logic array 15 has the capability of receiving up to 16 inputs at 16 input terminals and of providing up to 8 outputs at 8 output terminals. A plurality of control signals as discussed below are also supplied thereto and timing logic 16 is also depicted. In utilizing the programmed logic array 15 in accordance with the invention, the output functions which are to be generated are suitably selected and the input signals which are required for generating such output functions are also suitably selected, together with the desired functional relationships therebetween as needed for such generation. It is such selected functional relationships which are suitably programmed in the programmed logic array unit.

Programmed logic array units (sometimes known as field programmable logic arrays) which are usable for such purpose are presently available to those in the art, typical logic arrays which can be used in the context of applicant's invention being made and sold, for example, by Signetics Corporation of Sunnyvale, Calif. under the Model designations Nos. 82S100 or 82S101. A general description of such program logic arrays, for example, is contained in a brochure entitled "Signetics Field Programmable Logic Arrays", published by and available from Signetics Corporation and dated February 1976.

In accordance with applicant's invention, such a program logic array can be utilized for generating the desired write and read error words in accordance with the selected polynomial functions and for performing the desired multiplexing operations of the invention by providing the following selected outputs therefrom:

1. Input to ECC bit 31
2. Input to ECC bit 29
3. Input to ECC bit 2$\phi$
4. Input to ECC bit 1$\phi$
5. Input to ECC bit 8
6. Serial data to the disk
7. Serial data from the disk The first five outputs listed above are supplied on lines 17–21 to the corresponding bit locations of the ECC register 11 which, in accordance with the polynomial functions as described above in connection with FIGS. 2 and 3, require feedback to be applied thereto. All other bit locations of the ECC register 11 are simply the contents of the next higher location delayed by one clock time period.

The sixth output listed above as supplied on line 22 is the serial data which is to be written onto the disk and is, in effect, the multiplexed output of the serial data words received from the data processing system for writing onto the disk plus the error word from the ECC register as generated during the write mode of operation. Such data is appropriately synchronized for such purpose by flip-flop circuitry 25 the operation of which is suitably controlled by the write clock signal (WR CLOCK) and the WRITE GATE signal for supplying the synchronized data as WR DATA therefrom.

The seventh output listed above as supplied on line 23 is the serial data which is received from the disk during a read mode of operation and is the multiplexed combination of the data words from the disk and the remainder word left in the ECC register after the effective comparison of the write error word and the read error word. Such output is supplied to the system via shift register 1$\phi$ which converts the data from serial to parallel form.

In order to generate the above outputs the following selected inputs are utilized in accordance with the invention:

1. Output from ECC bit $\phi$
2. Output from ECC bit 9
3. Output from ECC bit 11
4. Output from ECC bit 21
5. Output from ECC bit 3$\phi$
6. Serial bit 15 (SR15)—serial output from shift register 1$\phi$
7. Serial bit $\phi$ (SR$\phi$)—serial input to shift register 1$\phi$
8. DATA IN (serial data from the disk)
9. EN ECC CLK
10. RD ECC
11. SHIFT ECC The first five inputs listed above are all ECC bits from register 11 which bits are appropriately combined to produce the desired write or read error words in accordance with the selected polynomial functions discussed in connection with FIGS. 2 and 3.

The sixth and seventh inputs listed above are data inputs from or to the shift register 1$\phi$, respectively, for use in implementing the logic equations discussed below in more detail in the write and read operating modes. The data to be written or to be read is supplied in a multiplex manner by the logic array as input to the ECC register for producing error words, as input data to the disk in the case of the write operation, or as output data from the disk to the shift register in the case of the read operation. The output data from the disk in the latter case is supplied to the logic array as DATA IN and thereupon from the logic array to shift register 1$\phi$ on line 26.

The EN ECC CLK input is a control signal which enables the ECC register operation.

The RD ECC and SHIFT ECC inputs are coded control signals for controlling four desired modes of operation, i.e., a first mode (where such inputs are $\phi,\phi$) for generating the error word during the write mode, a second mode (where such inputs are 1,$\phi$) for writing the error word onto the disk during the write mode, a third mode (where such inputs are $\phi$,1) for generating the error word during the read mode, and a fourth mode (where such inputs are 1,1) for checking the ECC register to produce the remainder therefrom during the read mode. Such control signals can be appropriately generated by a central processor unit of the data processing system for use during the read and write operating modes in a manner well known to those in the art.

In order to provide the desired operation of the program logic array for such purpose in accordance with the invention, the following selected logic equations have been derived for implementing the programmed logic array to generate the desired error words and to provide the desired multiplexing operations as required during the write and read modes of operation. Such logic equations are set forth below as Equations (1) through (7) and, as can be seen therein, the seven selected output functions are all appropriately related to the eleven input variables in accordance with the selected relations set forth therein. Although a typical programmed logic array of the type referred to above has 16 available inputs and 8 available outputs, only 11 of the inputs and 7 of the outputs need be utilized in the particular application described herein.

SELECTED LOGIC EQUATIONS

Bit 31 Input=$\overline{\text{SHIFT ECC}}\cdot\overline{\text{RD ECC}}\cdot$EN ECC$\cdot$[SR1-5$\oplus$ECC$\phi$]+$\overline{\text{SHIFT ECC}}\cdot$RD ECC$\cdot$EN ECC$\cdot$[SR-$\phi\oplus$ECC21]

Bit 29 Input=$\overline{\text{SHIFT ECC}}\cdot\overline{\text{RD ECC}}\cdot$EN ECC$\cdot$[SR1-5$\oplus$ECC$\phi\oplus$ECC3$\phi$]+$\overline{\text{SHIFT ECC}}\cdot$RD ECC$\cdot$EN ECC$\cdot$[SR$\phi\oplus$ECC3$\phi\oplus$ECC21]+SHIFT ECC$\cdot$EN ECC$\cdot$ECC3$\phi$ Bit 20 Input=$\overline{\text{SHIFT ECC}}\cdot\overline{\text{RD ECC}}\cdot$EN ECC$\cdot$[SR1-5$\oplus$ECC21$\oplus$ECC$\phi$]+SHIFT ECC$\cdot$EN ECC$\cdot$ECC21+$\overline{\text{SHIFT ECC}}\cdot$RD ECC$\cdot$EN ECC$\cdot$[SR-$\phi\oplus$ECC$\phi$]

Bit 10 Input=$\overline{\text{SHIFT ECC}}\cdot\overline{\text{RD ECC}}\cdot$EN ECC$\cdot$[SR1-5$\oplus$ECC11$\oplus$ECC$\phi$]+SHIFT ECC$\cdot$EN ECC$\cdot$ECC11+$\overline{\text{SHIFT ECC}}\cdot$RD ECC$\cdot$EN ECC$\cdot$ECC11

Bit 8 Input=$\overline{\text{SHIFT ECC}}\cdot\overline{\text{RD ECC}}\cdot$EN ECC$\cdot$[SR1-5$\oplus$ECC9$\oplus$ECC$\phi$]+SHIFT ECC$\cdot$EN ECC$\cdot$ECC9+$\overline{\text{SHIFT ECC}}\cdot$RD ECC$\cdot$EN ECC$\cdot$ECC9

Serial Data Out=SHIFT ECC·$\overline{\text{RD}}$ $\overline{\text{ECC}}$·EN ECC·ECC$\phi$+$\overline{\text{EN ECC}}$·SR15+SHIFT ECC·RD ECC·EN ECC·SR15

Serial Data In=SHIFT ECC·$\overline{\text{RD}}$ $\overline{\text{ECC}}$·EN ECC·ECC$\phi$+$\overline{\text{EN ECC}}$·DATA IN+SHIFT ECC·RD ECC·EN ECC·DATA IN The above logic equations are derived from the particular selected exemplary polynomial functions discussed above. As an example of how such derivations can be made, logic equation (1) can be considered as follows:

Bit 31 Input=$\overline{\text{SHIFT ECC}}$·$\overline{\text{RD}}$ $\overline{\text{ECC}}$·EN ECC·[SR15⊕ECC$\phi$]+$\overline{\text{SHIFT ECC}}$·RD ECC·EN ECC·[SR$\phi$⊕ECC21]

During the generation of the error word in accordance with the write polynomial, $x^{32}+x^{23}+x^{21}+x^{11}+x^2+1$, as can be understood with reference to the feedback configuration of FIG. 2, the bit 31 input is the exclusive-OR'd output of the serial data input from register 1$\phi$ to the disk (SR15) and the $\phi$-bit from the ECC register (ECC$\phi$). During such write mode the ECC register must be enabled (EN ECC) and the above discussed coded control signals (inputs 1$\phi$ and 11 above) must be in such coded form as to provide for generating an error word during the write mode ($\overline{\text{SHIFT ECC}}$·$\overline{\text{RD ECC}}$), i.e., a ($\phi,\phi$) code.

Further, during the read mode generation of the error word in accordance with the read polynomial function, $(x^{11}+x^2+1)$ $(x^{21}+1)$, as can be understood with reference to the feedback configuration of FIG. 3, the bit 31 input is the exclusive-OR'd output of the serial data into register 1$\phi$ from the disk (SR$\phi$), which data is supplied via logic array from the DATA IN input thereto and thence on line 23 therefrom, and bit 21 from the ECC register (ECC21). Moreover, during the read mode the ECC register must be enabled as before (EN ECC) and the coded control signals must be in such coded form as to provide for generating an error word during the read mode ($\overline{\text{SHIFT ECC}}$·RD ECC), i.e., a ($\phi,1$) code. The remaining logic equations are similarly derived.

Such logic equations (1) through (7) can be implemented by the programmed logic array in accordance with known techniques described, for example, in the above-identified Signetics brochure, once the logic equations having the selected input and outputs and selected relations therebetween have been set up.

Other shift register (SR) and ECC register control signals shown in FIG. 5 (SR MODE SEL 1, $\overline{\text{SR EN OUT}}$, DIORESET, SR CLOCK, CLEAR ECC) can all be generated in suitable and known manners in the central processing unit of the data processing system as would be within the skill of the art.

In summary, during the write mode, parallel data words are supplied to shift register 1$\phi$ and thence in serial form from the serial output terminal SR15 to the programmed logic array 15. The data words are then supplied on output line 22 to the synchronizing means 25 (i.e., synchronized to the WR CLOCK signal generated by timing logic 16) for supply to the disk as WR DATA. The data words are also supplied to the ECC register 11 on line 17 to the bit 31 input thereof for use in generating the desired write error word in accordance with the selected polynomial function. The write error word is then supplied to the logic array 15 from the ECC bit $\phi$ terminal of the ECC register 11 on line 27 for subsequent supply to the disk on line 22 as part of the WR DATA (also suitably synchronized). Thus, the data words incoming from the data processing system and the write error word generated by the error detection circuitry are written onto the disk.

During the read mode, the data words and writer error word from the disk are supplied to the logic array 15 at the DATA IN terminal and, thence, the data words are supplied to the shift register 1$\phi$ in serial form on line 23 to the $\phi$-bit input terminal thereof. Such data words are thereupon supplied to the system in parallel form therefrom. The data words are also supplied to the ECC register 11 on line 17 for use in producing a read error word. The write error word is thereupon supplied to the ECC register in which the read error word has been generated and, if the write and read error words are equivalent (i.e., the data words that have been read out from the disk are the same as the data words that have been written thereon and no errors exist), a zero remainder word is present in the ECC register. On the other hand, if an error in the data words as read out is present, a non-zero remainder word exists in the ECC register, which non-zero remainder word is thereupon supplied to the logic array on line 27 and thence to the shift register on line 23 for subsequent supply to the system in order to signify that one or more errors are present, the remainder word being appropriately interpreted for identifying and correcting the errors involved.

The implementation of the above logic equations having the selected input variables for producing the desired selected output variables in the program logic array in accordance with the invention greatly reduces the overall number of logic elements needed for error detection in comparison with prior art systems and provides the desired advantages thereover in terms of increased speed of operation, lower power requirements, increased reliability, and reduced cost.

What is claimed is:

1. Error detection circuitry for use in a data processing system having a data storage device comprising
    first register means capable of accepting data words in parallel form and supplying said parallel data words in serial form and further capable of accepting data words in serial form and supplying said serial data words in parallel form;
    error register means capable of accepting serial data words and producing an error word in response thereto;
    programable logic array means programmed to perform the following operations:
    (1) controlling, during a write operating mode, the supplying of serial data words from said first register means to said data storage device and to said error register means, said error register means thereby producing a write error word,
    (2) controlling, during said write operating mode, the supplying of said write error word from said error register means to said data storage device for storage therein with said data words,
    (3) controlling, during a read operating mode, the supplying of data words from said data storage device to said first register means and to said error register means, said error register means thereby producing a read error word in response thereto,
    (4) controlling, during said read operating mode, the supplying of said write error word from said data storage device to said error register means when said read error word has been produced therein, said error register means thereby providing a remainder word, (5) controlling, during said read operating mode, the supplying of said remainder word to said first register means.

2. Error detection circuitry in accordance with claim 1 wherein said data storage device is a magnetic disk storage unit.

3. Error detection circuitry in accordance with claim 2 wherein said programmable logic array means has a first selected number of inputs which includes a plurality of bits from said error register means;

serial data words from said first register means to be supplied to said magnetic disk storage unit;

serial data words from said magnetic disk storage unit to be supplied to said first register means;

a control signal for controlling the enabling of said error register means, and coded control signals for controlling the generation of said write and read error words during said write and read operating modes, respectively;

for controlling the supplying of said write error to said magnetic disk storage unit; and for controlling the supplying of said remainder word to said first regiater means.

4. Error detection circuitry in accordance with claim 3 wherein said programmable logic array means is programmed so as to provide said write error in accordance with a first selected polynomial function determined by a first selected number of said plurality of bits from said error register and so as to provide said read error word in accordance with a second selected polynomial function determined by second selected ones of said plurality of bits from said error register means, said second polynomial function being equivalent to said first polynomial function.

5. Error detection circuitry in accordance with claim 4 wherein said first selected polynomial function is the function $x^{32}+x^{23}+x^{21}+x^{11}+x^2+1$ and said second polynomial function is the function $(x^{11}+x^2+1)(x^{21}+1)$.

6. Error detection circuitry in accordance with claim 5 wherein said error register means is a 32-bit register and said first selected ones of said plurality of bits from said error register means are bits $\phi$, 9, 11, 21 and $3\phi$ and said second selected ones of said plurality of bits from said error register means are bits 8, $1\phi$, $2\phi$, 29 and 31.

7. Error detection circuitry for use in a data processing system comprising means for producing write and read error words in response to data words during write and read operating modes, respectively, and for comparing said write and read error words to produce remainder words therefrom; and programmable logic array means programmed to control the producing of said write and read error words and to control the producing of said remainder words in accordance with said comparison.

8. Error detection circuitry in accordance with claim 7 wherein said programmable logic array means is programmed to control the producing of said write and said read error words in accordance with selected polynomials.

9. Error detection circuitry in accordance with claims 7 or 8 wherein said programmable logic array means is programmed to control the producing of said write and said read error words and the producing of said remainder words in a multiplexed manner.

* * * * *